(12) United States Patent
Kurematsu et al.

(10) Patent No.: US 9,541,174 B2
(45) Date of Patent: Jan. 10, 2017

(54) CHAIN TENSIONER

(71) Applicant: TSUBAKIMOTO CHAIN CO., Osaka-shi, Osaka (JP)

(72) Inventors: Yuji Kurematsu, Osaka (JP); Yudai Takagi, Osaka (JP)

(73) Assignee: TSUBAKIMOTO CHAIN CO., Osaka-shi (JP)

( * ) Notice: Subject to any disclaimer, the term of this patent is extended or adjusted under 35 U.S.C. 154(b) by 0 days.

(21) Appl. No.: 14/661,443

(22) Filed: Mar. 18, 2015

(65) Prior Publication Data

US 2015/0292602 A1 Oct. 15, 2015

(30) Foreign Application Priority Data

Apr. 11, 2014 (JP) .................. 2014-081635

(51) Int. Cl.
F16H 7/22 (2006.01)
F16H 7/08 (2006.01)

(52) U.S. Cl.
CPC ......... F16H 7/08 (2013.01); *F16H 2007/0812* (2013.01)

(58) Field of Classification Search
CPC ............... F16H 2007/0812; F16H 2007/0859; F16H 7/0848; F16H 2007/0806; F16H 2007/0891
USPC ........................................ 474/110
See application file for complete search history.

(56) References Cited

U.S. PATENT DOCUMENTS 4,792,322 A * 12/1988 Goppelt .............. F16H 7/08 474/136
4,963,121 A * 10/1990 Himura ................ F16H 7/08 474/110
5,352,159 A * 10/1994 Suzuki ................ F16H 7/08 474/110
5,860,881 A * 1/1999 Tada .................. F16H 7/08 474/101
5,908,363 A * 6/1999 Suzuki ............... F16H 7/0848 474/101
6,045,471 A * 4/2000 Suzuki ................ F16H 7/08 474/109
6,053,831 A * 4/2000 Boedo ............... F16H 7/0848 474/109
6,086,497 A * 7/2000 Fukuda ............. F16H 7/0836 474/101

(Continued)

FOREIGN PATENT DOCUMENTS

JP   9-177907 A    7/1997
JP   4376279 B2   12/2009

*Primary Examiner* — Henry Liu
(74) *Attorney, Agent, or Firm* — Westerman, Hattori, Daniels & Adrian, LLP

(57) ABSTRACT

Provided is a chain tensioner that can, with a simple structure, supply sufficient and necessary oil when restarted after a long time after the stop of oil supply, and control pressing force in accordance with operating conditions during the drive, thereby reducing vibration of the chain not only when restarted but also during the drive. In a chain tensioner 100 in which a plunger 120 inserted in a plunger bore of a tensioner body 110 is biased outward by biasing means 140 provided in an oil pressure chamber 101 to be extendable and contractible, an oil supply hole 114, an oil supply space 102, and a plunger hole 124 that together form a continuous oil supply passage is formed in such a shape that an oil amount changes in accordance with a position of the plunger 120.

6 Claims, 9 Drawing Sheets

(56) References Cited

U.S. PATENT DOCUMENTS

| | | | | |
|---|---|---|---|---|
| 6,602,154 B1 * | 8/2003 | Guichard | ................ | F16H 7/08 474/101 |
| 6,609,987 B1 * | 8/2003 | Beardmore | ............... | F01L 1/02 474/111 |
| 6,634,973 B1 * | 10/2003 | Simpson | ............... | F16H 7/0848 474/109 |
| 6,729,986 B2 * | 5/2004 | Kurohata | .............. | F16H 7/0848 474/110 |
| 7,918,754 B2 * | 4/2011 | Kurematsu | ........... | F16H 7/0848 474/110 |
| 2008/0318717 A1 * | 12/2008 | Kurematsu | ........... | F16H 7/0848 474/110 |

* cited by examiner

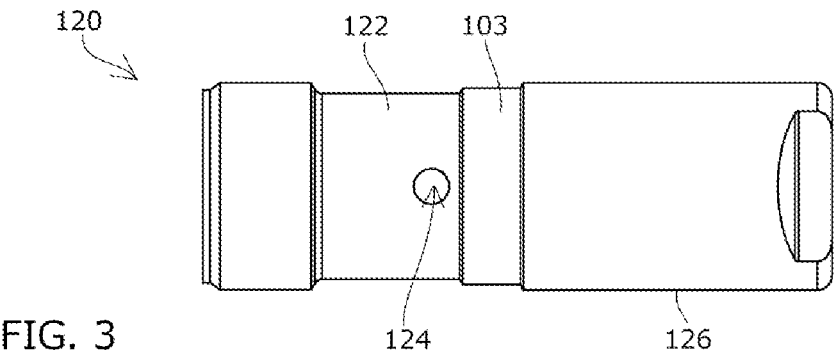
FIG. 3
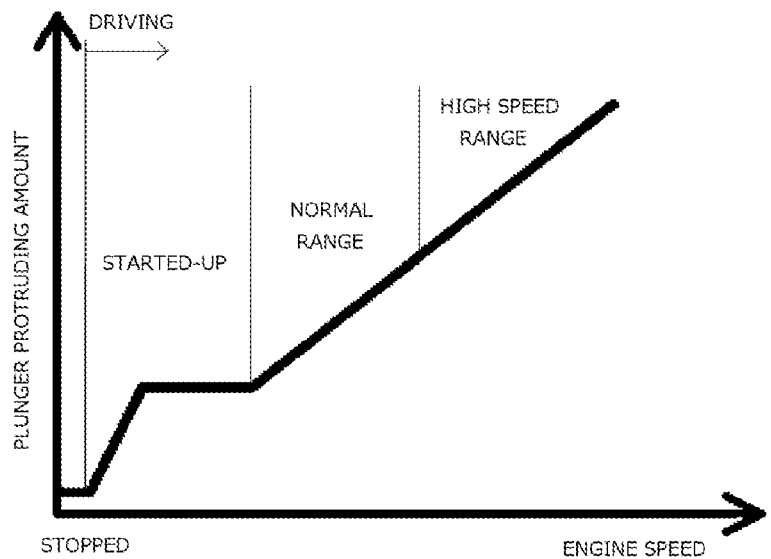
FIG. 4
FIG. 5
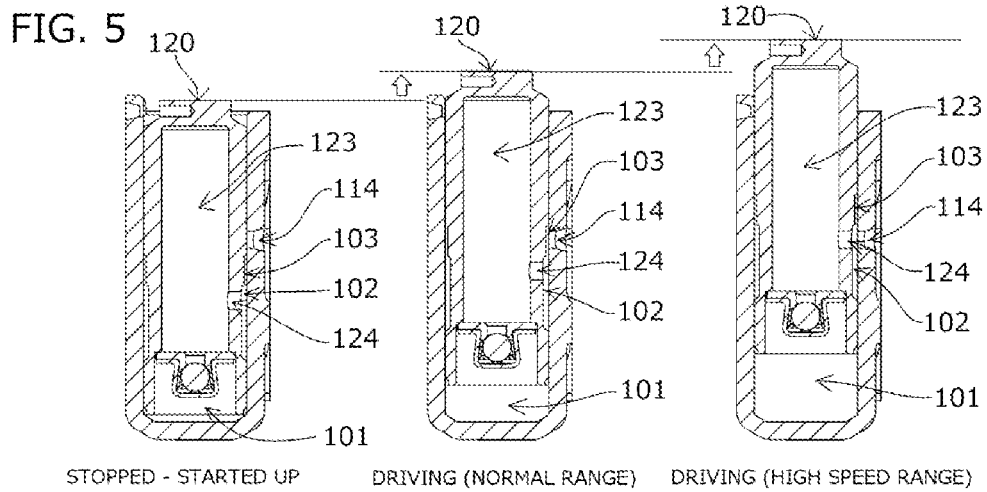

CHAIN TENSIONER

BACKGROUND OF THE INVENTION

1. Field of the Invention

The present invention relates to a chain tensioner including a tensioner body having a cylindrical plunger bore with an open end, a cylindrical plunger slidably inserted into the plunger bore, and biasing means accommodated inside an oil pressure chamber formed between the plunger bore and the rear end of the plunger such as to be able to expand and contract and to bias the plunger outward, the chain tensioner being used for maintaining appropriate tension of a chain.

2. Description of the Related Art

It has been common practice to use a chain tensioner for maintaining appropriate tension in the chain. For example, in a chain guide mechanism that slidably guides a transmission chain such as an endless roller chain passing over respective sprockets of a crankshaft and a cam shaft inside an engine room, by means of a guide shoe, it is known to press a pivoting chain guide having the guide shoe with a chain tensioner to maintain appropriate tension.

For example, as shown in FIG. 20, an endless timing chain CH passes over a drive sprocket S1 attached to a crankshaft and a pair of driven sprockets S2 and S3 attached to cam shafts in an engine room. A chain guide mechanism has a pivoting chain guide G1 and a stationary chain guide G2 for guiding this timing chain CH.

The stationary chain guide G2 is fixed in position in the engine room with two mounting shafts B1 and B2, while the pivoting chain guide G1 is attached such as to be pivotable around the mounting shaft B0 in the plane in which the timing chain CH runs in the engine room.

The chain tensioner 500 maintains the tension of the timing chain CH at an appropriate level as well as reduces its vibration by pressing the pivoting chain guide G1 against the chain.

The known chain tensioner 500 used in such a chain guide mechanism includes, for example, as shown schematically in FIG. 21, a tensioner body 510 having a cylindrical plunger bore 511 with an open end, a cylindrical plunger 520 in the plunger bore 511 to slide against the inner surface 513 of the plunger bore 511, and biasing means that biases the plunger 520 outward from the plunger bore 511.

The biasing means is a coil spring 540 accommodated inside a cylindrical recess 521 in the cylindrical plunger 520 and compressed between the plunger and the bottom 512 of the plunger bore 511.

Oil is supplied from an oil supply hole 514 formed in the plunger bore 511, so that an oil pressure chamber 501 formed between the plunger bore 511 and the plunger 520 is filled with oil, which oil biases the plunger 520 outward. A check valve 550 (schematically shown as a check ball) stops the oil from flowing out from the oil supply hole 514.

As the plunger 520 reciprocates, oil flows through the small gap between the plunger 520 and the plunger bore 511, and the flow resistance provides the damping effect of slowing down the reciprocal movement of the plunger 520.

In such a known chain tensioner 500, when let stand for a long time after the oil supply is stopped (in the case with an engine, after the engine is stopped), there is a time lag before oil is supplied immediately after the next start-up, and as no oil is replenished but the oil in the oil pressure chamber 501 leaks out when the plunger 520 moves back and forth, there occurs a shortage of oil in the oil pressure chamber 501. Because of this shortage of oil, the damping force of the oil does not act on the plunger 520, which sometimes lead to vibration and abnormal noise of the timing chain CH, or may damage the timing chain CH.

Therefore, it is also known to design the tensioner to have an oil reservoir chamber inside the plunger to supply oil into the oil pressure chamber (see Japanese Patent Application Laid-open No. H09-177907 and Japanese Patent No. 4376278). A constant amount of oil is retained in the oil reservoir chamber without leaking, so that, even immediately after the start-up after a long stop, oil remaining in the oil reservoir chamber is supplied to the oil pressure chamber, to maintain the damping force of oil for the plunger and to prevent vibration or damage of the chain.

SUMMARY OF THE INVENTION

With the technique described in Japanese Patent Application Laid-open No. H09-177907, however, most of the oil supplied from the oil reservoir chamber (oil reserve chamber 9) into the oil pressure chamber (high pressure chamber 14) leaks out from the oil pressure chamber through the gap between the plunger and the plunger bore (plunger chamber 4) as the plunger reciprocates immediately after the start-up, and leaks out from the oil supply hole (supply hole 12) or from the distal end of the plunger, so that the amount of oil in the oil reservoir chamber (oil reserve chamber 9) is reduced gradually.

It is therefore necessary for the oil reservoir chamber (oil reserve chamber 9) to retain enough oil inside during the time lag before oil is supplied from the oil supply hole (supply hole 12) immediately after the start-up. However, the oil level cannot be maintained higher than the oil supply hole (supply hole 12).

Accordingly, the oil reservoir chamber (oil reserve chamber 9) needs to have a large capacity inside, because of which the entire tensioner can not be made shorter and can hardly be made smaller.

With the technique described in Japanese Patent No. 4376278, the oil supply hole (oil supply hole 122) is arranged in an upper part and oriented diagonally forward so that the oil that has leaked from the oil pressure chamber (high pressure oil chamber R) through the gap between the plunger and the plunger bore is at least prevented from leaking through the oil supply hole (oil supply hole 122) to the outside.

However, this configuration poses restrictions on the position of the oil supply hole (oil supply hole 122) because it cannot be applied to a design in which oil is supplied other than from above.

The inventors have found out that vibration of the chain can be reduced even during the drive by controlling the pressing force of the plunger in accordance with the operating conditions.

However, with the known techniques of Japanese Patent Application Laid-open No. H09-177907 and Japanese Patent No. 4376278, the continuous oil supply passage formed by the oil supply hole, oil supply space, and plunger hole is designed to secure a sufficient amount of oil necessary for pressing the plunger outward during the drive, where adjustment of oil pressure is not taken in account at all. Therefore, control of the pressing force in accordance with the operating conditions during the drive is hard to achieve.

No chain tensioners designed with the idea of controlling the pressing force in accordance with the operating conditions by controlling the pressure of oil supplied during the drive is known yet.

The present invention is directed to solve these problems, and aims to provide a chain tensioner that can, with a simple structure, supply sufficient and necessary oil when restarted after a long time after the stop of oil supply, and control pressing force in accordance with operating conditions during the drive, thereby reducing vibration of the chain not only when restarted but also during the drive.

The chain tensioner according to the present invention solves the problems described above by including: a tensioner body having a cylindrical plunger bore with an open end; a cylindrical plunger slidably inserted into the plunger bore, the plunger including a plunger body and a check valve provided inside the plunger body; and biasing means accommodated inside an oil pressure chamber formed between the plunger bore and a rear end of the plunger such as to be able to expand and contract and to bias the plunger outward, wherein an oil reservoir chamber is formed on an outer side than the check valve inside the plunger body, an oil supply space is formed between an inner circumferential surface of the plunger bore and an outer circumferential surface of the plunger body, an oil supply hole for supplying oil to the oil supply space is formed in the plunger bore, a plunger hole for supplying oil from the oil supply space to the oil reservoir chamber is formed in the plunger body, the oil supply hole, the oil supply space, and the plunger hole together form a continuous oil supply passage, and the oil supply passage is formed in such a shape that an oil amount changes in accordance with a position of the plunger.

According to the chain tensioner as set forth in claim 1, the oil supply hole, the oil supply space, and the plunger hole together form a continuous oil supply passage that is formed in such a shape that an oil amount changes in accordance with a position of the plunger, so that the chain tensioner can, with a simple structure, supply sufficient and necessary oil when restarted after a long time after the stop of oil supply, and control pressing force in accordance with operating conditions during the drive, thereby reducing vibration of the chain not only when restarted but also during the drive.

When the engine is restarted after a long stop, the chain is at low temperature and there is no stretch. The plunger is therefore located at the most inward position. The plunger position changes during the drive, as the stretch of the chain differs depending on the load on the chain and the temperature.

Therefore, by forming the oil supply passage in such a shape that an oil amount changes in accordance with the position of the plunger, the hydraulic pressing force applied on the plunger can be controlled, whereby the control of pressing force in accordance with operating conditions including when the engine is stopped is made possible.

When the engine is restarted after a long stop, no oil is supplied, and also oil leaks out from the oil supply hole. Therefore, by minimizing the flow amount in the oil supply passage when the plunger is located at the most inward position as close as possible to zero, more oil can be retained, and also, the amount of oil recovered from the supply space to the oil reservoir chamber as the plunger reciprocates when the engine is restarted is increased significantly, so that sufficient and necessary oil can be kept when restarted.

This way, vibration of the chain can be suppressed not only when the engine is restarted but also during the drive without requiring active control of supplied oil pressure or the like, but with a simple structure, wherein the oil supply passage is formed in such a shape that an oil amount changes in accordance with the plunger position.

According to the configuration as set forth in claim 2 and claim 6, the plunger groove or body groove have portions with different depths along a protruding direction of the plunger, so that the oil amount can be limited by the depth of the groove, and thus the oil amount can be changed as desired depending on the plunger position with a simple structure.

According to the configuration as set forth in claim 3 and claim 7, an annular recess in the plunger or the tensioner body includes a portion where the diameter changes continuously or stepwise, so that the oil amount can be changed as desired in accordance with the plunger position with a simple structure. Setting of a certain oil amount is also possible by utilizing the circumferential positional relationship between the oil supply hole and plunger hole, or, conversely, a certain amount of oil can be kept irrespective of the circumferential positional relationship between them.

According to the configuration as set forth in claim 4, claim 8, claim 10 and claim 12, the oil supply hole or the plunger hole is located such that the hole connects to the oil supply space with different opening areas depending on the position of the plunger, so that the oil amount can be changed as desired depending on the plunger position, while the plunger groove or body groove is configured simply.

According to the configuration as set forth in claim 5, claim 9, claim 11 and claim 13, the oil supply hole or the plunger hole is provided in plurality along the protruding direction of the plunger, so that, with a simple process of making holes, the oil amount can be changed as desired depending on the plunger position.

BRIEF DESCRIPTION OF THE DRAWINGS

FIG. 3 is a side view of the plunger of the chain tensioner according to the first embodiment of the present invention;

FIG. 4 is a graph showing the relationship between the operating condition of the chain tensioner and the plunger position;

FIG. 5 is a diagram for explaining the operation of the chain tensioner according to the first embodiment of the present invention;

DESCRIPTION OF THE PREFERRED EMBODIMENTS

The chain tensioner of the present invention may be embodied in any specific form as long as it includes: a tensioner body having a cylindrical plunger bore with an open end; a cylindrical plunger slidably inserted into the plunger bore, the plunger including a plunger body and a check valve provided inside the plunger body; and biasing means accommodated inside an oil pressure chamber formed between the plunger bore and a rear end of the plunger such as to be able to expand and contract and to bias the plunger outward, wherein an oil reservoir chamber is formed on an outer side than the check valve inside the plunger body, an oil supply space is formed between an inner circumferential surface of the plunger bore and an outer circumferential surface of the plunger body, an oil supply hole for supplying oil to the oil supply space is formed in the plunger bore, a plunger hole for supplying oil from the oil supply space to the oil reservoir chamber is formed in the plunger body, the oil supply hole, the oil supply space, and the plunger hole together form a continuous oil supply passage, and the oil supply passage is formed in such a shape that an oil amount changes in accordance with a position of the plunger, whereby the chain tensioner can, with a simple structure, supply sufficient and necessary oil when restarted after a long time after the stop of oil supply, and control pressing force in accordance with operating conditions during the drive, thereby reducing vibration of the chain not only when restarted but also during the drive.

Embodiment 1

A chain tensioner 100 according to a first embodiment of the present invention will be described with reference to the drawings.

Figure 1:
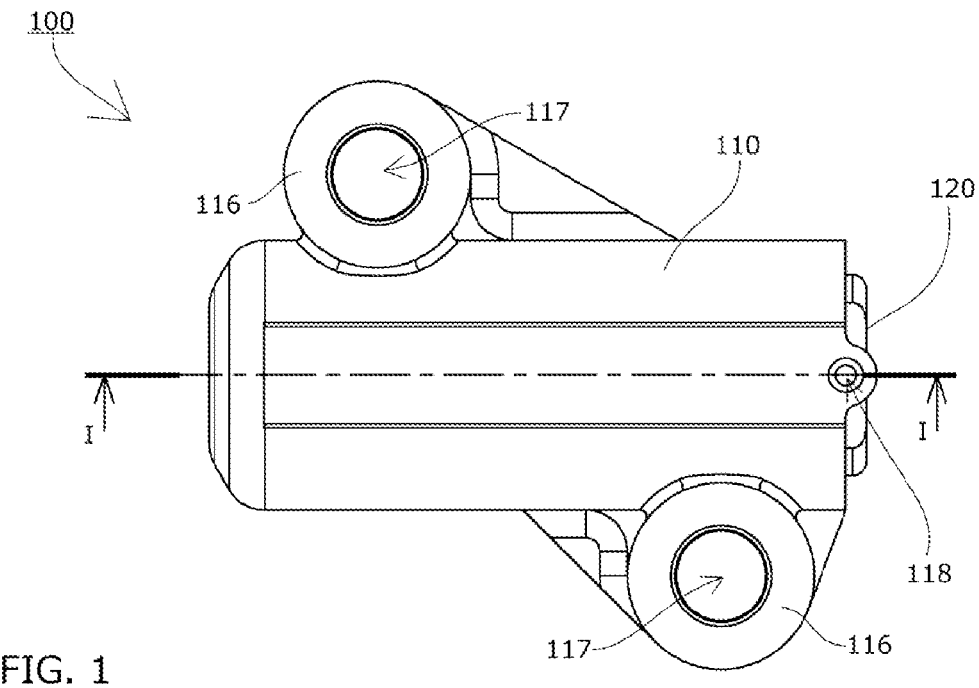
FIG. 1 is a front view of a chain tensioner according to a first embodiment of the present invention.
Figure 2:
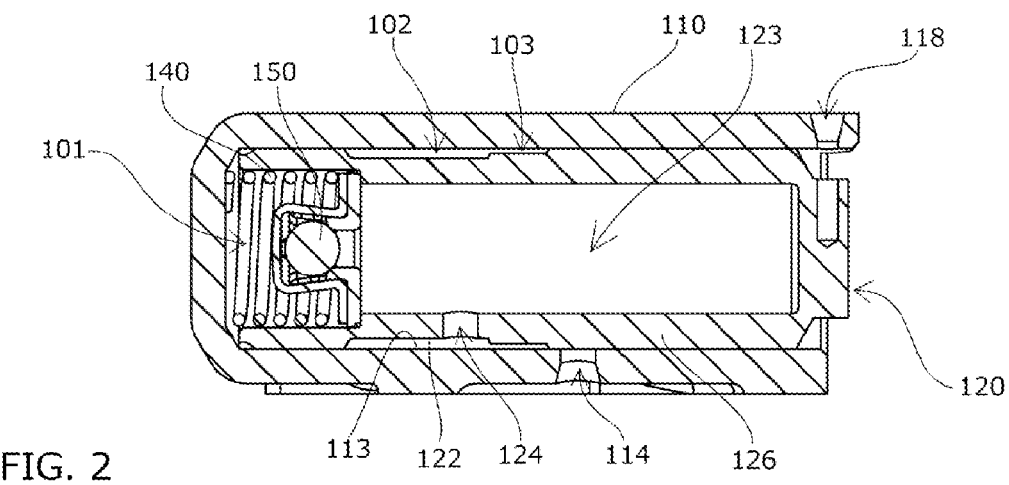
FIG. 2 is a cross-sectional view along I-I of FIG. 1.

The chain tensioner 100 according to the first embodiment of the present invention includes, as shown in FIG. 1 to FIG. 3, a tensioner body 110 having a cylindrical plunger bore with an open end, a cylindrical plunger 120 slidably inserted into the plunger bore, and a coil spring 140 that is biasing means accommodated inside an oil pressure chamber 101 formed between the plunger bore and the rear end of the plunger 120 such as to be able to expand and contract and to bias the plunger 120 outward.

The chain tensioner 100 according to this embodiment is securely mounted inside an engine having a chain guide mechanism. For this purpose, the tensioner body 110 has mounting parts 116 with mounting holes 117 for bolts or the like to pass through, as shown in FIG. 1.

An oil supply hole 114 is formed in the tensioner body 110 that connects the inner circumferential surface 113 of the plunger bore with outside so that oil is supplied.

Near the opening of the plunger bore is formed a pin hole 118 that radially extends through, so that, with a retainer pin (not shown) inserted in the pin hole 118, the plunger 120 can be fixed in its retracted position, to enable mounting of the tensioner including the plunger 120 assembled therein in the engine or any other such work.

The plunger 120 includes a plunger body 126, and a check valve 150 provided inside the plunger body 126.

The check valve 150 is located inside the plunger body 126, and an oil reservoir chamber 123 is formed on an outer side than the check valve 150.

The coil spring 140 accommodated inside the oil pressure chamber 101 such as to be able to expand and contract and to bias the plunger 120 outward is configured to be seated at one end on the bottom of the plunger bore and at the other end on the outer periphery of the retainer of the check valve 150, so as to efficiently use the depth of the inside of the plunger body 126 as the space for the coil spring 140 to expand and contract.

A plunger groove 122 is formed in the outer circumferential surface of the plunger body 126 as a plunger annular recess having a smaller diameter than that of the outer circumferential surface of the plunger body 126, to form a tubular oil supply space 102 between itself and the inner circumferential surface 113 of the plunger bore.

The plunger body 126 is formed with a plunger hole 124 that connects the oil supply space 102 and the oil reservoir chamber 123 inside for supplying oil.

In this embodiment, the plunger groove 122 is formed as a stepped plunger annular recess having a large-diameter part on the outward side and a small-diameter part on the inward side, the large-diameter part on the outward side forming a flow amount adjustment part 103.

The tensioner body 110 is fixedly attached to a mounting wall portion (not shown) inside the engine when used, and the oil supply hole 114 is oriented toward the mounting wall portion.

How the chain tensioner 100 according to the first embodiment of the present invention configured as described above operates will be explained.

In the timing system of the engine in which the chain tensioner 100 of this embodiment is used, when the engine is restarted after a long stop, the chain is at low temperature and there is no stretch. The stretch of the chain differs depending on the load on the chain and the temperature during the drive.

As shown in the graph of FIG. 4 and the explanatory diagram of FIG. 5, when the engine is stopped, the plunger is located at the most inward position. At start-up when the engine speed is low and the temperature has not risen yet, the plunger does not protrude much. During normal operation, as the chain tension increases with the engine speed, the elastic stretch increases, so that the plunger protrudes more.

The oil supply hole 114 is located such that oil is supplied from oil supply means mounted in the mounting wall portion (not shown). Oil starts to be delivered to the oil supply hole 114 after a while when the engine is started.

When the engine that was stopped is started up, the plunger 120 in the chain tensioner 100 reciprocates with the vibration of the chain in a position near the most inward position as shown on the left in FIG. 5.

Since no oil is supplied immediately after the start-up, the tensioner has to operate only with the oil remaining in the oil pressure chamber 101 and the oil reservoir chamber 123.

When the plunger 120 protrudes, the oil inside the oil reservoir chamber 123 flows through the check valve 150 into the oil pressure chamber 101, while, when the plunger retracts, the oil inside the oil pressure chamber 101 leaks along the outer circumferential surface of the plunger 120 and flows into the oil supply space 102.

The position of the plunger groove 122 can be suitably set so that the groove does not face the oil supply hole 114 when the plunger 120 is located near the most inward position, so that the oil supply passage formed by the oil supply hole 114, oil supply space 102, and plunger hole 124 is almost blocked at the exit of the oil supply hole 114. Therefore, even under a condition where oil supply has not started yet, oil can flow from the oil supply space 102 through the plunger hole 124 back into the oil reservoir chamber 123. Oil leakage from the oil supply hole 114 is thus reduced and oil shortage at start-up can be prevented.

During the normal drive, the plunger 120 in the chain tensioner 100 reciprocates with the vibration of the chain at a position protruded correspondingly to the engine speed.

The position of the large-diameter plunger annular recess of the plunger groove 122 can be suitably set so that the recess faces the oil supply hole 114 in the normal speed range as shown in the center in FIG. 5, so that the oil supplied from the oil supply hole 114 into the oil supply space 102 can be throttled by the flow amount adjustment part 103.

The position of the small-diameter plunger annular recess of the plunger groove 122 can be suitably set so that the recess faces the oil supply hole 114 in the high speed range as shown on the right in FIG. 5, so that a large amount of oil is supplied from the oil supply hole 114 directly into the oil supply space 102.

This way, the hydraulic pressing force of the plunger 120 is made smaller in the normal speed range where chain tension is low and larger in the high speed range where chain tension is high, and thus the pressing force can be adjusted optimally in accordance with the chain tension.

In this embodiment, various elements such as the shape of the plunger groove 122, positions and the like of the oil supply hole 114 and plunger hole 124 may be designed optimally in accordance with various factors such as engine characteristics and the adjustment range of the chain tension.

Figure 6:
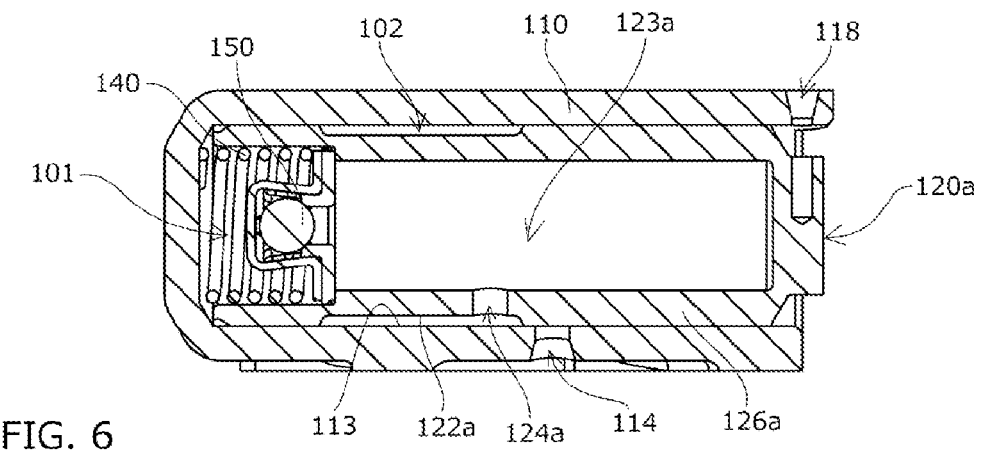
FIG. 6 is a cross-sectional view of a first variation example of the chain tensioner according to the first embodiment of the present invention.
Figure 7:
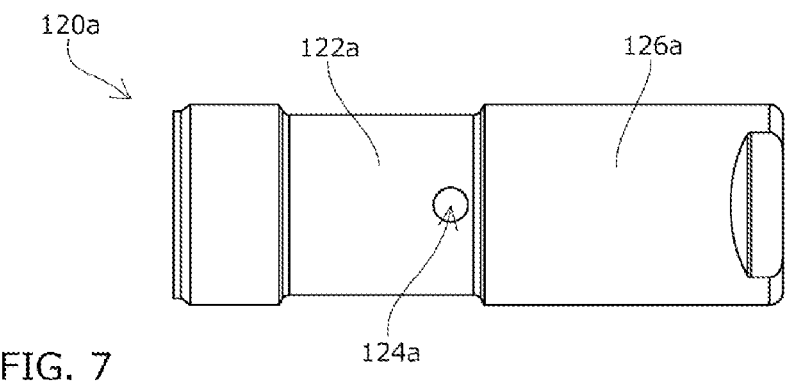
FIG. 7 is a side view of the plunger of the first variation example of the chain tensioner according to the first embodiment of the present invention.

For example, in the chain tensioner according to a first variation example, the plunger groove 122*a* of the plunger 120*a* is formed as a plunger annular recess with a uniform diameter, as shown in FIG. 6 and FIG. 7 (other elements are given the same reference numerals as those of the chain tensioner 100 of the previously described first embodiment).

This first variation example can be applied to an engine with little variation in the speed, for example, where a predetermined optimal amount of oil can be supplied irrespective of the protruding amount of the plunger 120*a* during the normal drive so as to press the plunger 120*a* with a constant pressing force. At start-up, similarly to the chain tensioner 100 according to the first embodiment, there is hardly any oil flow at the exit of the oil supply hole 114, so that oil shortage before the start of oil supply can be prevented.

Figure 8:
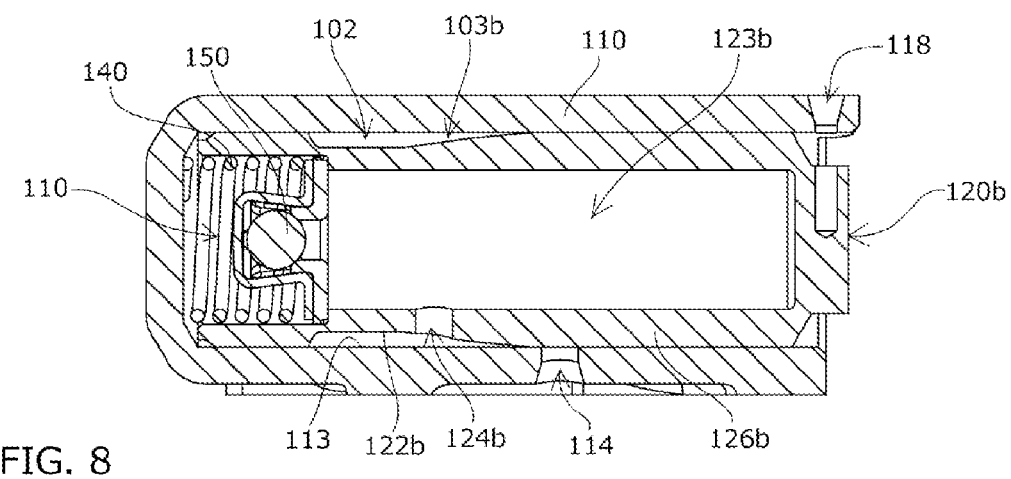
FIG. 8 is a cross-sectional view of a second variation example of the chain tensioner according to the first embodiment of the present invention.
Figure 9:
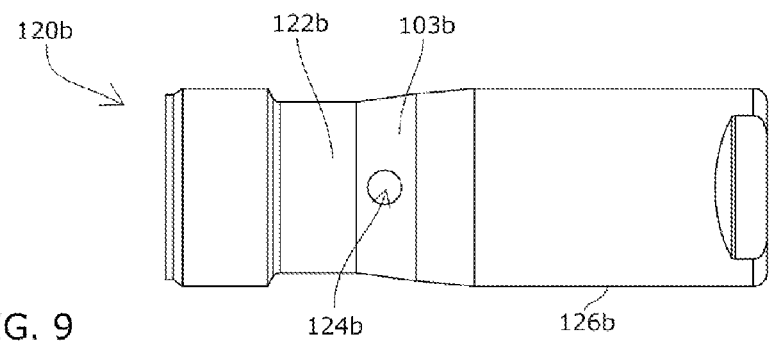
FIG. 9 is a side view of the plunger of the second variation example of the chain tensioner according to the first embodiment of the present invention.

In the chain tensioner according to a second variation example, the plunger groove 122*b* of the plunger 120*b* has two tapered portions where the diameter is gradually reduced inward, these tapered portions forming the flow amount adjustment part 103*b*, as shown in FIG. 8 and FIG. 9.

The plunger hole 124*b* is formed in the second (inner) tapered portion. (The chain tensioner is configured the same in other respects as the chain tensioner 100 according to the previously described first embodiment.)

In this second variation example, with the tapered portions where the diameter is gradually reduced inward, the amount of oil increases continuously in accordance with the protruding amount of the plunger 120*b*.

This feature of the plunger 120*b* continuously protruding more with an increase in the engine speed as shown in FIG. 4 can be used to allow fine control of pressing force in accordance with the engine speed during the drive, in particular in the normal speed range.

At start-up, similarly to the chain tensioner 100 according to the first embodiment, there is hardly any oil flow at the exit of the oil supply hole 114, so that oil shortage before the start of oil supply can be prevented.

The length, angle, number of the tapered portions, and the position of the plunger hole 124*b* may be suitably set as required in accordance with the engine characteristics and the adjustment range of the chain tension.

Figure 10:
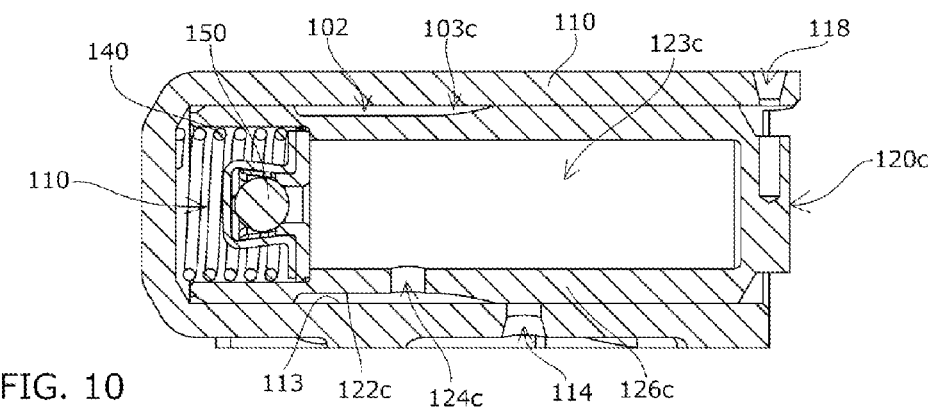
FIG. 10 is a cross-sectional view of a third variation example of the chain tensioner according to the first embodiment of the present invention.
Figure 11:
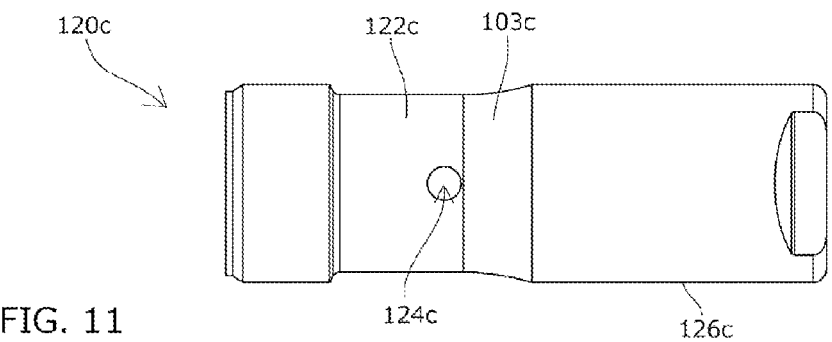
FIG. 11 is a side view of the plunger of the third variation example of the chain tensioner according to the first embodiment of the present invention.

In the chain tensioner according to a third variation example, the plunger groove 122*c* of the plunger 120*c* has a rounded portion wherein the diameter is gradually reduced inward, this rounded portion forming the flow amount adjustment part 103*c*, as shown in FIG. 10 and FIG. 11. (The chain tensioner is configured the same in other respects as the chain tensioner 100 according to the previously described first embodiment.)

In this third variation example, with the rounded portion where the diameter is gradually reduced inward, the amount of oil increases continuously in accordance with the protruding amount of the plunger 120*c*, and also, the oil amount can be increased not linearly but in a curved manner because of the shape of the rounded portion.

This feature can be used to allow fine control of pressing force in accordance with the engine speed during the drive, in particular in the normal speed range, similarly to the second variation example of the chain tensioner.

At start-up, similarly to the chain tensioner 100 according to the first embodiment, there is hardly any oil flow at the exit of the oil supply hole 114, so that oil shortage before the start of oil supply can be prevented.

The length, shape and the like of the rounded portion, and the position of the plunger hole 124*c* may be suitably set as required in accordance with the engine characteristics and the adjustment range of the chain tension.

The rounded portion in this variation example may be applied to either one of the tapered portions of the second variation example.

Figure 12:
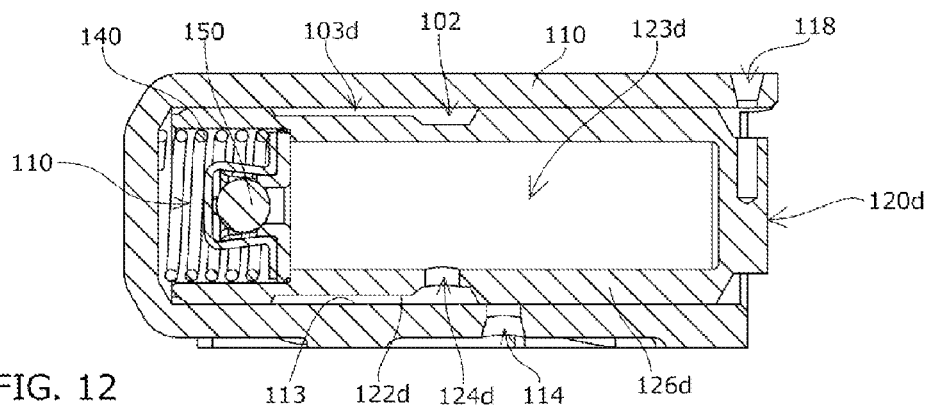
FIG. 12 is a cross-sectional view of a fourth variation example of the chain tensioner according to the first embodiment of the present invention.
Figure 13:
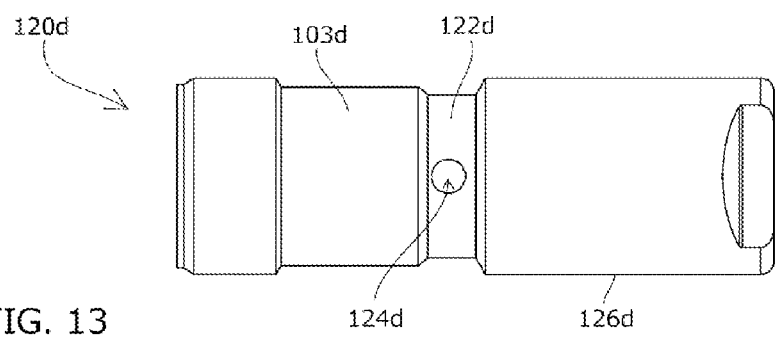
FIG. 13 is a side view of the plunger of the fourth variation example of the chain tensioner according to the first embodiment of the present invention.

In the chain tensioner according to a fourth variation example, the plunger groove 122*d* of the plunger 120*d* has a plunger annular recess with a smaller diameter on the outward side, with the plunger hole 124*d* arranged there, and a plunger annular recess with a larger diameter on the inward side, as shown in FIG. 12 and FIG. 13, these recesses forming the flow amount adjustment part 103*d*. (The chain tensioner is configured the same in other respects as the chain tensioner 100 according to the previously described first embodiment.)

With this fourth variation example, the amount of oil can be increased to raise the pressing force in the normal speed range of the drive, while the oil can be throttled to decrease the pressing force in the high speed range where the plunger 120*d* protrudes largely.

This way, the pressing force can be reduced in the high speed range where chain tension is high, to lessen the tension, thereby to prevent application of excessive tension on the chain.

At start-up, similarly to the chain tensioner 100 according to the first embodiment, there is hardly any oil flow at the exit of the oil supply hole 114, so that oil shortage before the start of oil supply can be prevented.

The length, diameter and the like of each of the small-diameter and large-diameter plunger annular recesses, and the position of the plunger hole 124*d* may be suitably set as required in accordance with the engine characteristics and the adjustment range of the chain tension.

The tapered portions of the second variation example, and the rounded portion of the third variation example may be applied either alone or in combination at a suitable position.

Embodiment 2

Figure 14:
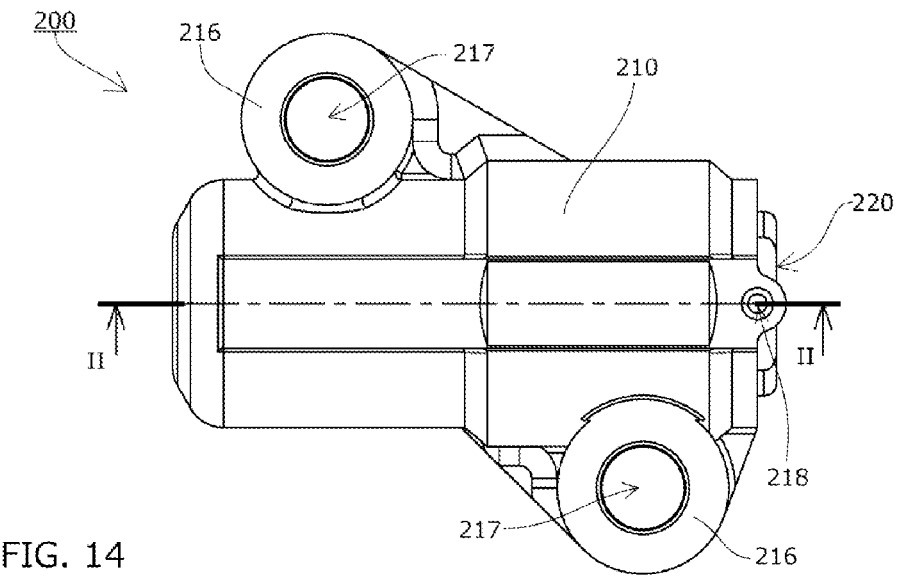
FIG. 14 is a front view of a chain tensioner according to a second embodiment of the present invention.
Figure 15:
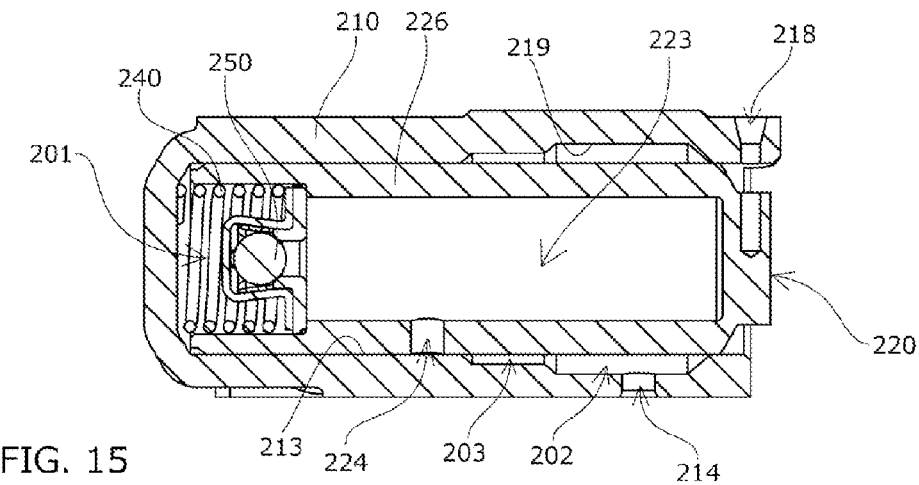
FIG. 15 is a cross-sectional view along II-II of FIG. 14.

The chain tensioner 200 according to a second embodiment of the present invention is different from the chain tensioner 100 according to the previously described first embodiment in that, as shown in FIG. 14 and FIG. 15, the tubular oil supply space 202 is formed between a body groove 219 formed in the inner circumferential surface 213 of the plunger bore as a body annular recess with a larger diameter than that of the inner circumferential surface 213 of the plunger bore, and the outer circumferential surface of the plunger body 226, and is otherwise configured the same (same parts and elements are given reference numerals starting with number 2 as the hundred's digit and with the same last two digits as the reference numerals of corresponding parts and elements of the first embodiment).

The chain tensioner 200 according to this embodiment operates similarly to the chain tensioner 100 according to the previously described first embodiment and provides the same effects.

Since the oil supply space 202 and the oil supply hole 214 are located on the outer side than in the first embodiment, if the chain tensioner is installed such that the plunger protrudes upward from the horizontal plane, less oil will leak from the oil supply hole 214 during a long stop, and this way, even more oil can be made to remain in the oil reservoir chamber 223.

In the chain tensioner 200 according to this embodiment, too, various elements such as the shape of the body groove 219, positions and the like of the oil supply hole 214 and plunger hole 224 may be designed optimally in accordance with various factors such as engine characteristics and the adjustment range of the chain tension, similarly to the chain tensioner 100 according to the first embodiment.

Figure 16:
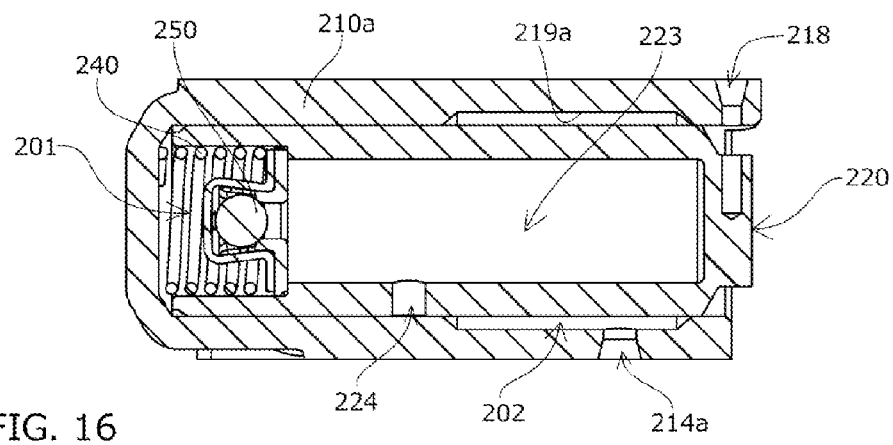
FIG. 16 is a cross-sectional view of a fifth variation example of the chain tensioner according to the second embodiment of the present invention.

For example, in the chain tensioner according to a fifth variation example, the body groove 219*a* in the inner circumferential surface of the plunger bore is formed as a body annular recess with a uniform diameter, as shown in FIG. 16. (The chain tensioner is configured the same in other respects as the chain tensioner 200 according to the previously described second embodiment.)

This fifth variation example provides the same effects as the first variation example of the chain tensioner 100 according to the previously described first embodiment.

In the chain tensioner 200 according to the second embodiment, too, the body groove 219 may be shaped to have the same functions as those of the plunger grooves 122*b*, 122*c*, and 122*d* of the second to fourth variation examples of the chain tensioner 100 according to the previously described first embodiment.

Embodiment 3

Figure 17:
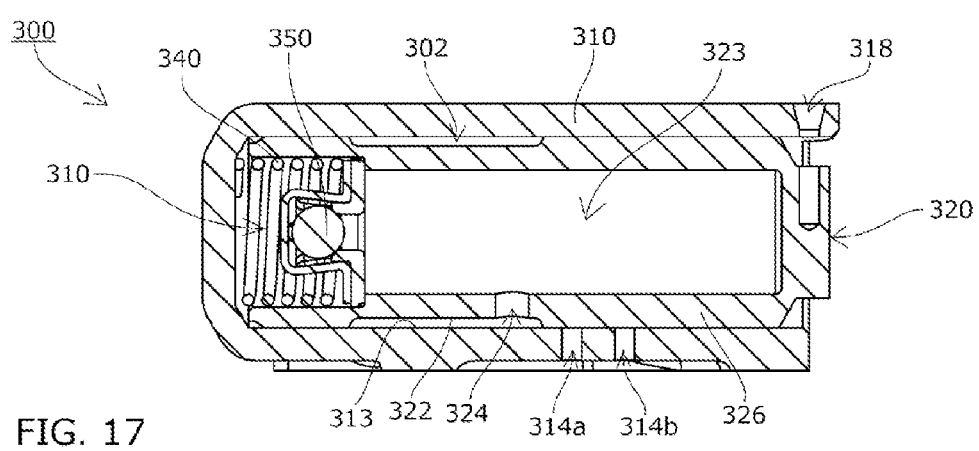
FIG. 17 is a cross-sectional view of the chain tensioner according to a third embodiment of the present invention.

The chain tensioner 300 according to a third embodiment of the present invention, as shown in FIG. 17, has two oil supply holes 314 that supply a smaller amount of oil and are formed in the plunger 320 at an interval along the protruding direction of the plunger 320, as compared to the first variation example of the chain tensioner 100 according to the previously described first embodiment, and is otherwise configured the same (same parts and elements are given reference numerals starting with number 3 as the hundred's digit and with the same last two digits as the reference numerals of corresponding parts and elements of the first embodiment).

In the chain tensioner 300 according to this embodiment, the position of the plunger groove 322 can be suitably set so that the groove faces only one oil supply hole 314*a* in the normal speed range, so that the amount of oil supplied into the oil supply space 302 can be adjusted to a smaller amount as it is delivered from one oil supply hole 314*a*.

The position of the plunger groove 322 can be suitably set so that the groove faces both of the oil supply holes 314*a* and 314*b* in the high speed range, so that a large amount of oil is supplied from the two oil supply holes 314*a* and 314*b* into the oil supply space 302.

This way, the hydraulic pressing force of the plunger 320 is made smaller in the normal speed range where chain tension is low and larger in the high speed range where chain tension is high, and thus the pressing force can be adjusted optimally in accordance with the chain tension.

The position of the plunger groove 322 can be suitably set so that the groove does not face either of the oil supply holes 314*a* and 314*b* when the plunger 320 is located near the most inward position, so that, even under a condition where oil supply has not started yet, oil can flow from the oil supply space 302 through the plunger hole 324 back into the oil reservoir chamber 323. Oil leakage from the oil supply holes 314*a* and 314*b* is thus reduced and oil shortage at start-up can be prevented.

Embodiment 4

Figure 18:
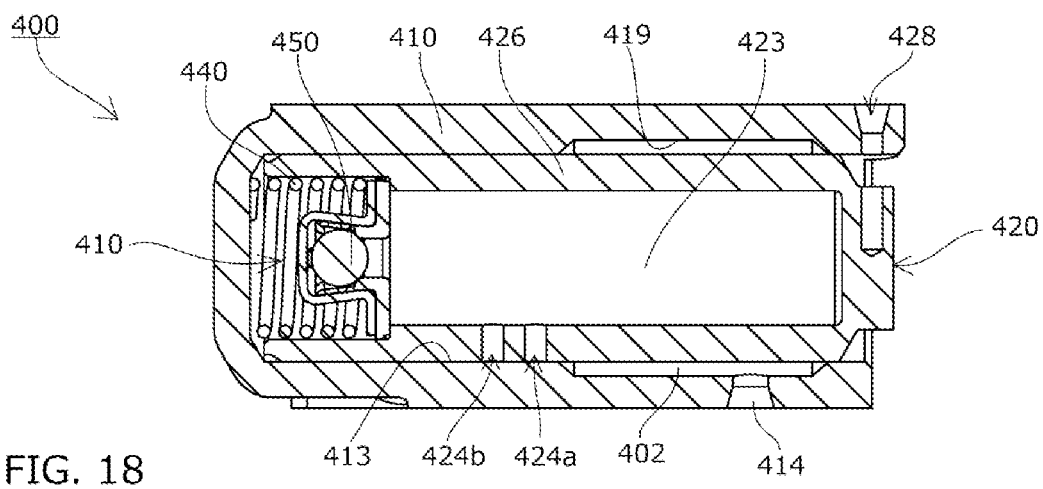
FIG. 18 is a cross-sectional view of the chain tensioner according to a fourth embodiment of the present invention.
Figure 19:
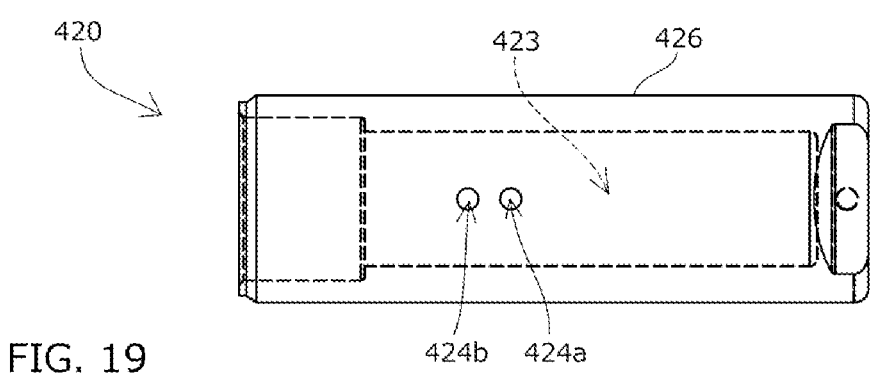
FIG. 19 is a side view of the plunger of the chain tensioner according to the fourth embodiment of the present invention.
Figure 20:
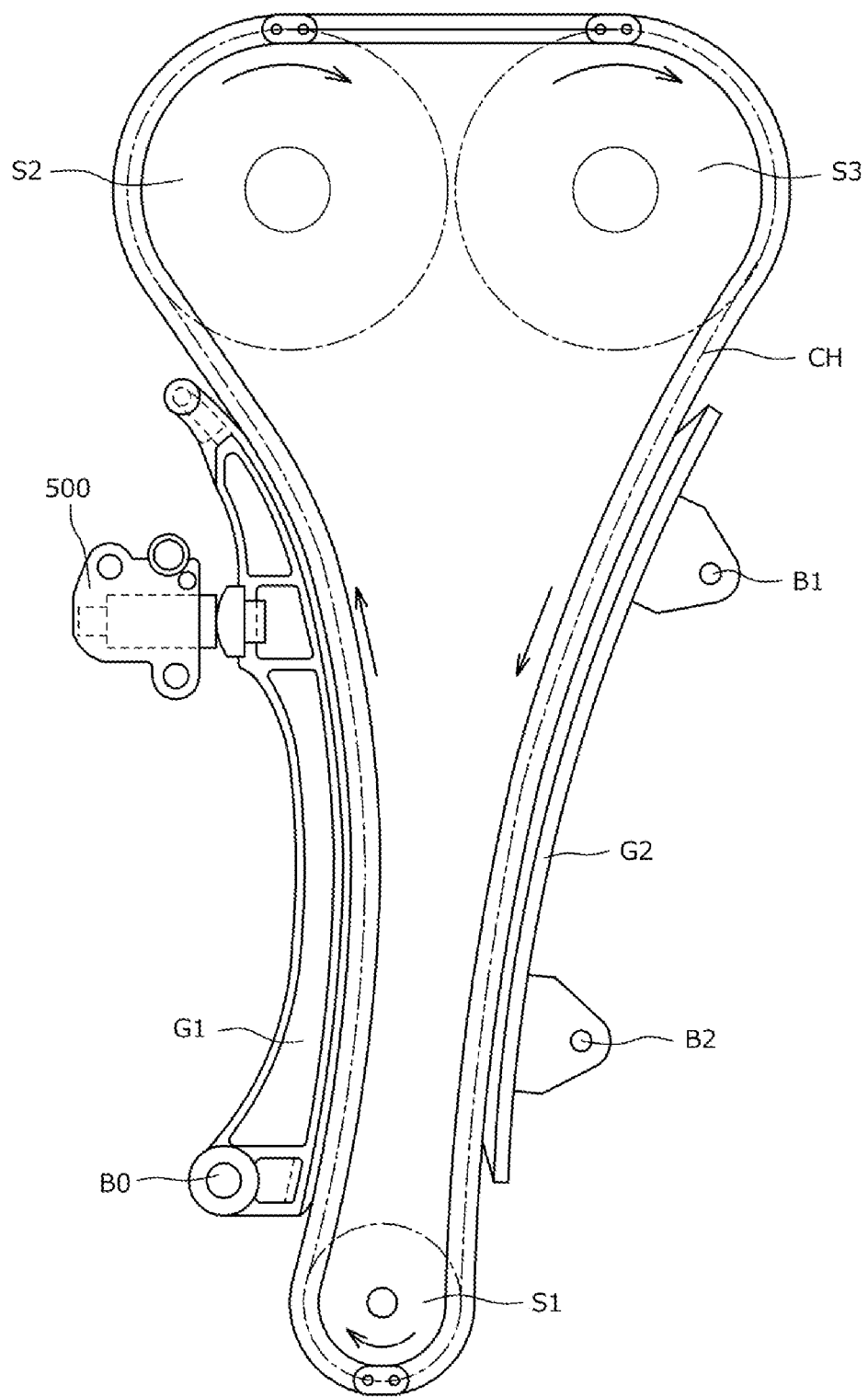
FIG. 20 is an explanatory diagram of the chain tensioner used in the chain guide mechanism of an engine.
Figure 21:
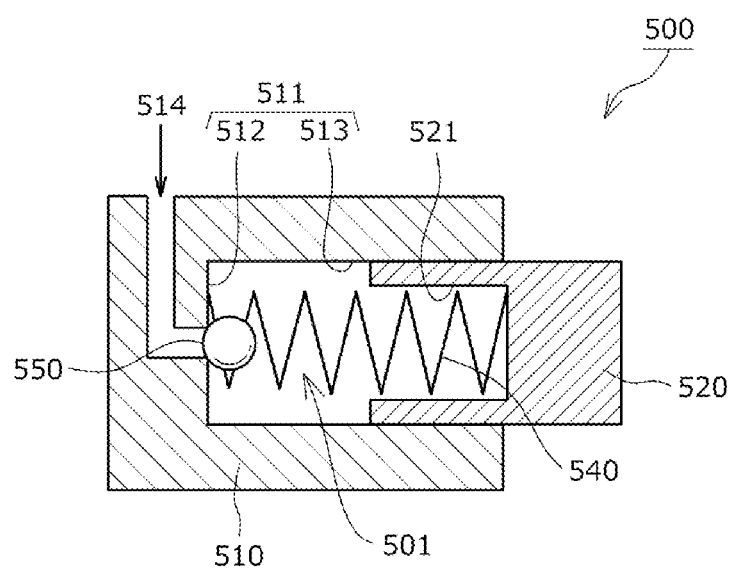
FIG. 21 is a schematic explanatory diagram of a conventional chain tensioner.

The chain tensioner 400 according to a fourth embodiment of the present invention is different from the chain tensioner 300 according to the previously described third embodiment in that, as shown in FIG. 18 and FIG. 19, the tubular oil supply space 402 is formed between a body groove 419 formed in the inner circumferential surface 413 of the plunger bore as a body annular recess with a larger diameter than that of the inner circumferential surface 413 of the plunger bore, and the outer circumferential surface of the plunger body 426, and in that it has one oil supply hole 414 and two plunger holes 424, and is otherwise configured the same (same parts and elements are given reference numerals starting with number 4 as the hundred's digit and with the same last two digits as the reference numerals of corresponding parts and elements of the first embodiment).

The chain tensioner 400 according to this embodiment operates similarly to the chain tensioner 300 according to the previously described third embodiment and provides the same effects.

Since the oil supply space 402 and the oil supply hole 414 are located on the outer side than in the third embodiment, if the chain tensioner is installed such that the plunger protrudes upward from the horizontal plane, less oil will leak from the oil supply hole 414 during a long stop, and this way, even more oil can be made to remain in the oil reservoir chamber 423.

While specific examples of the chain tensioner according to the present invention have been described in the embodiments and variation examples above, the chain tensioner according to the present invention is not limited to these examples, and the shapes, positions, sizes, and positional relationships with each other of various constituent parts may be changed in various manners, or variously combined as required.

For example, while the plunger grooves 122 and 322 or the body grooves 219 and 419 are formed as annular recesses that extend all around in the embodiments and variation examples described above so that the supply space 102, 202, 302, or 402 is tubular, the plunger grooves 122 and 322 or the body grooves 219 and 419 may be formed circumferentially only in part (in such a shape as, for example, the connection/adjustment groove 123 of Japanese Patent No. 4376278 mentioned above), so that the supply space 102, 202, 302, or 402 does not extend all around, as long as oil can be supplied and recovered into the oil reservoir chamber 123 at start-up.

Other components commonly included in a chain tensioner, such as a ratchet mechanism, may of course be added to the configurations of the embodiments and variation examples described above.

The chain tensioner of the present invention may not necessarily be applied to a chain guide mechanism that uses a guide shoe for slidably guiding a transmission chain such as an endless roller chain passing over respective sprockets of a crankshaft and a cam shaft in an engine room, but may also be adopted in applications where the chain is slidably guided directly by the distal end of the plunger.

The chain tensioner may not necessarily be applied to a chain transmission mechanism but also used for similar transmission mechanisms that use belts, ropes and the like, and can be applied in a variety of industrial fields where it is necessary to generate a pressing force by oil or to deliver enough oil when restarted after a long time after the oil supply was stopped.

What is claimed is:

1. A chain tensioner, comprising:
   a tensioner body having a cylindrical plunger bore with an open end;
   a cylindrical plunger slidably inserted into the plunger bore, the plunger including a plunger body and a check valve provided inside the plunger body; and
   biasing means accommodated inside an oil pressure chamber formed between the plunger bore and a rear end of the plunger such as to be able to expand and contract and to bias the plunger outward, wherein
   an oil reservoir chamber is formed on an outer side than the check valve inside the plunger body,
   an oil supply space is formed between an inner circumferential surface of the plunger bore and an outer circumferential surface of the plunger body,
   an oil supply hole for supplying oil to the oil supply space is formed in the plunger bore,
   a plunger hole for supplying oil from the oil supply space to the oil reservoir chamber is formed in the plunger body,
   the oil supply hole, the oil supply space, and the plunger hole together form a continuous oil supply passage,
   the oil supply passage is formed in such a shape that an oil amount changes in accordance with a position of the plunger,
   wherein the oil supply space is formed between a plunger groove formed in the outer circumferential surface of the plunger body and the inner circumferential surface of the plunger bore,
   the plunger groove having chamfered ends defining ends of the oil supply space and having portions with different depths intermediate between the chamfered ends along a protruding direction of the plunger, and
   wherein widths, in the protruding direction of the plunger, of said portions with different depths are larger than a diameter, in the protruding direction of the plunger, of said oil supply hole such that a first of said portions with different depths is aligned with and extends fully across said oil supply hole, in the protruding direction of the plunger, when said plunger is in a first position and a second of said portions with different depths is aligned with and extends fully across said oil supply hole, in the protruding direction of the plunger, when said plunger is in a second position.

2. The chain tensioner according to claim 1, wherein the plunger groove is formed as a plunger annular recess with a smaller diameter than that of the outer circumferential surface of the plunger body,
   the plunger annular recess including a portion where the diameter changes continuously or stepwise.

3. The chain tensioner according to claim 1, wherein the oil supply hole is located such that the oil supply hole connects to the oil supply space with different opening areas depending on the position of the plunger.

4. The chain tensioner according to claim 3, wherein the oil supply hole is provided in plurality along a protruding direction of the plunger.

5. The chain tensioner according to claim 1, wherein the plunger hole is located such that the plunger hole connects to the oil supply space with different opening areas depending on the position of the plunger.

6. The chain tensioner according to claim 5, wherein the plunger hole is provided in plurality along a protruding direction of the plunger.

* * * * *